United States Patent
Vora et al.

(10) Patent No.: US 7,927,524 B2
(45) Date of Patent: Apr. 19, 2011

(54) METHOD FOR MOLDING GOLF BALL COVER OVER SOFT CORE

(75) Inventors: Ajay Vora, Foxboro, MA (US); Thomas L. Mydlack, Rochester, MA (US); Thomas E. Moore, Warren, RI (US); Robert A. Wilson, Sagamore, MA (US)

(73) Assignee: Acushnet Company, Fairhaven, MA (US)

( * ) Notice: Subject to any disclaimer, the term of this patent is extended or adjusted under 35 U.S.C. 154(b) by 261 days.

(21) Appl. No.: 12/251,633

(22) Filed: Oct. 15, 2008

(65) Prior Publication Data

US 2010/0090370 A1    Apr. 15, 2010

(51) Int. Cl.
*B29C 43/18* (2006.01)

(52) U.S. Cl. .......... 264/40.1; 264/40.5; 264/40.7

(58) Field of Classification Search ......... 264/40.1–40.7
See application file for complete search history.

(56) References Cited

U.S. PATENT DOCUMENTS

| | | | |
|---|---|---|---|
| 5,395,565 A * | 3/1995 | Nagaoka et al. | 264/40.5 |
| 5,919,100 A * | 7/1999 | Boehm et al. | 473/354 |
| 5,994,472 A | 11/1999 | Egashira et al. | |
| 6,838,036 B2 | 1/2005 | Sugimoto | |
| 6,846,442 B2 | 1/2005 | Sugimoto | |
| 7,115,049 B2 | 10/2006 | Sullivan et al. | |
| 7,153,926 B2 | 12/2006 | Isogawa et al. | |
| 7,182,703 B2 | 2/2007 | Emerson et al. | |
| 7,229,583 B2 | 6/2007 | Moriyama et al. | |
| 7,241,232 B2 | 7/2007 | Sullivan et al. | |
| 7,267,621 B2 | 9/2007 | Sullivan et al. | |
| 2003/0102587 A1 * | 6/2003 | Kobayashi et al. | 264/40.5 |

* cited by examiner

*Primary Examiner* — Christina Johnson
*Assistant Examiner* — Xue Liu
(74) *Attorney, Agent, or Firm* — D. Michael Burns

(57) ABSTRACT

A method for compression molding a thin cover layer over a large or soft core golf ball, wherein the process includes mold press speed of closure, pressure within the mold cavities, temperature of materials being molded, and the movement of the compression press is controlled by as the mold position rather than any fixed amounts of time. A Ram press is moved in a very controlled fashion during the low pressure stage by a servo controller, and is governed by data fed to a control computer by a linear potentiometer, which allows for a very deliberate movement, especially over the last 0.4 inches of closing. A pressure transducer and thermocouples determine the flow point of the cover layer. Once the cover material starts to flow, the Ram press is triggered into a high pressure close wherein the cover layer is formed and then finally cooled.

18 Claims, 4 Drawing Sheets

METHOD FOR MOLDING GOLF BALL COVER OVER SOFT CORE

FIELD OF THE INVENTION

This invention generally relates to the compression molding of a cover layer over a large or soft core golf ball.

BACKGROUND OF THE INVENTION

Conventional golf balls have primarily two functional components: the core and the cover. One purpose of the core is to be the "spring" of the ball or the principal source of resiliency, and the core may be either solid or wound. The primary purpose of the cover is to protect the core. Multi-layer solid balls include multi-layer core constructions, multi-layer cover constructions and combinations thereof.

Two-layer solid balls are made with a single, solid core. This single core is typically constructed from a cross-linked rubber, for example polybutadiene, and is encased by a single layer of hard cover material. Increasing the cross-link density of this core material increases the resiliency of the core. As the resiliency increases, however, the compression may also increase, resulting in a stiffer ball and increasing the spin rate of the ball. Spin rate is an important characteristic of golf balls for both skilled and recreational golfers.

Traditionally, in the multi-cavity compression molding of a golf ball cover or inner layer, preforms (preps) are made with much larger volume than required by the core geometry. This standard practice in general assures sufficient material to mold the core and formation of adequate matrix to hold parts together for easy de-molding at the end of the cycle. These molding processes consist of low pressure cures to pre-heat the prep once the prep assemblies are loaded and held under lower pressure to melt and displace significant amounts of material. Once the low pressure cure step is complete, the press closes at full hydraulic pressure to displace the remaining excess material and form a cover while still continuing to maintain a high temperature set point. The temperature set point typically needs to be high to melt excess material out and maintain the sizes especially at the poles. The melt flow variation due to climate changes and material specification changes are routine issues, with the molding parameters, especially temperature set points being constantly adjusted to maintain correct pole sizes. Also voids, longer cycles, frequent mold release applications are typical problems.

A major problem arises in molding a thin cover over a large and/or soft core because temperature and pressure are exerted over a set time independent of what material is placed in the press, or what temperature the material is at when placed in the press, or the actual compression of the core when the cover is formed around it. This may result in variations of the final product characteristics such as compression, weight, size, roundness, and layer adhesion.

Compression molding or retractable pin injection molding (RPIM) methods are most commonly used to form ionomer covers around solid or dual polybutadiene (PBD) cores. It is well known in the art that compression molding of a cover over a very soft PBD core causes a "blow out" of the core due to severe deformation of the PBD core during the mold closing. Also, it is very difficult to obtain acceptable roundness of the molded golf ball especially with softer (25-70 PGA) and larger cores (greater than 1.530"). Excessive core shifting is another major issue encountered. Similar issues are experienced with present RPIM technology due to forces resulting from "pinching" of retractable pins to hold softer PBD cores in the center and "hard to control" multi-directional plastic fluid forces during injection will greatly shift PBD cores as well as produce unacceptable out-of-round product.

A well known practice in the production of polybutadiene golf ball cores is a technique called "bumping" to aid in releasing of residual air in the mold cavity. This maneuver is where the mold is clamped for a short time (at least 15 seconds), and then unclamped to allow the residual air to release. This has been a standard practice in compression molding for over twenty years and is described in U.S. Pat. No. 6,838,036.

A method is needed to increase the successful molding of a cover layer over a very large or soft core "without blowing out" or deforming the core.

SUMMARY OF THE INVENTION

The present invention is directed to a method of compression molding a thin cover layer over a soft, large golf ball core, without fear of any "blow out" of material. The method utilizes a Ram press having a pair of molds, each mold having upper and lower mold frames, each frame containing multiple hemispherical cavities. The cover layer is provided in the form of hemispherical shells which are place around the core in each lower cavity. The Ram press is moved in a very controlled fashion during a low pressure stage, governed by data fed to a control computer by a linear potentiometer, and the Ram is controlled by a servo controller, which allows for a very deliberate movement, especially over the last 0.4 inches of closing. Pressure transducers and thermocouples feed data that determines the flow point of the cover layer. Once the cover material starts to flow, the Ram press is triggered into a high pressure close wherein the cover layer is cured and then finally cooled.

The method of the present invention allows the molding of cover layers, as thin as 0.020 inches and hardness of at least 60 Shore D, over extremely soft (15 to 55 PGA) polybutadiene cores and/or large cores of about 1.55 inches to 1.62 inches.

The method provides a core having a cross-linking agent and cross-linking activator.

Another object of the invention is the compression molding of a thin ionomer layer over a soft, large golf ball core, for the purpose of producing a three-piece golf ball. The method of forming the ionomer layer basically the same as described above for the forming of a cover layer, except that the cavities used for the inner cover ionomer layer would not have dimple patterns.

DETAILED DESCRIPTION OF PREFERRED EMBODIMENTS

Figure 1:
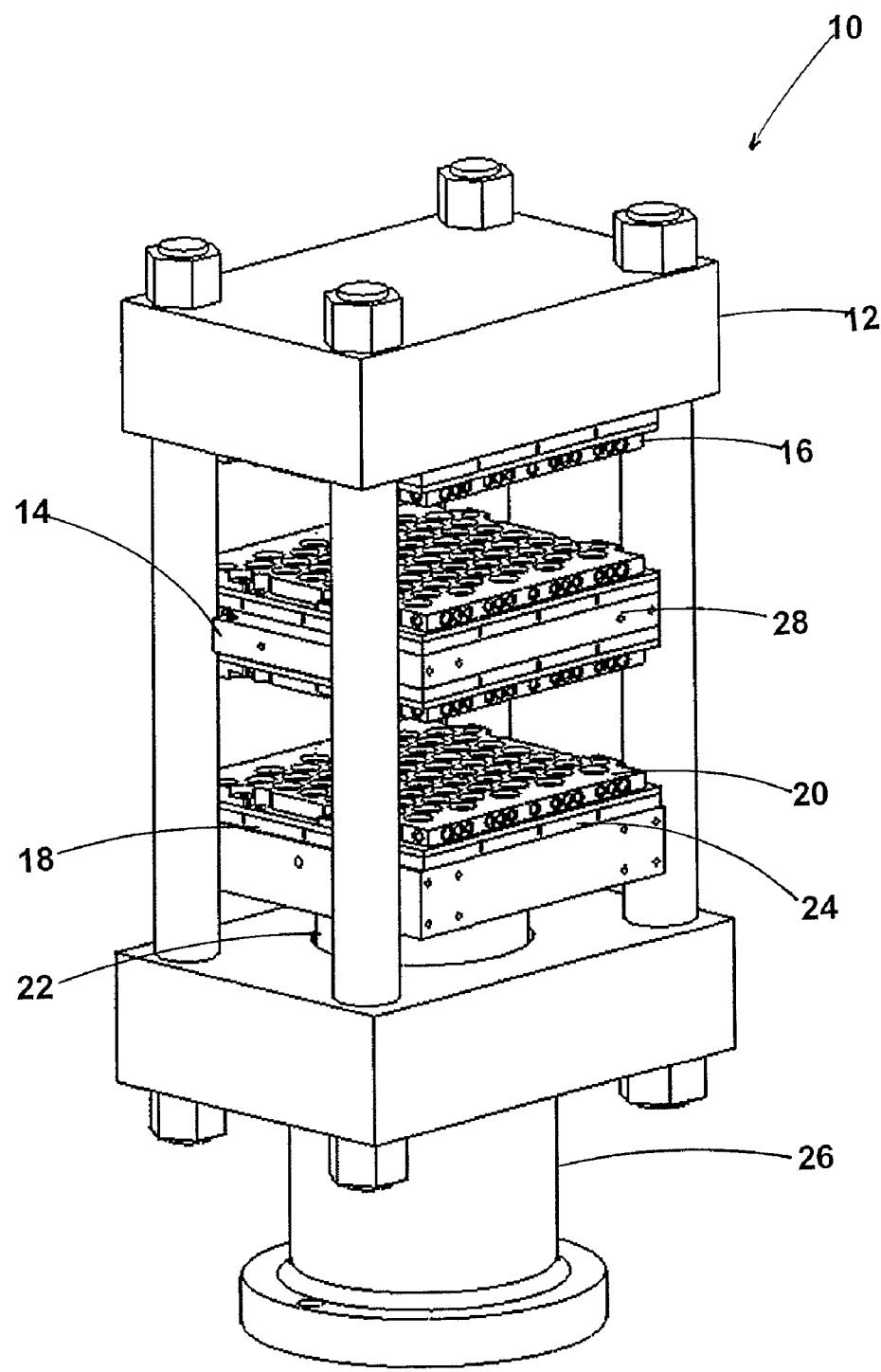
FIG. 1 is a perspective view of the compression mold of the invention.

Present day manufacturing processes for compression molding golf ball cover layers over center cores are not well suited when the cores are either very large and/or soft. Presently, the first step in manufacturing cores in the multi-cavity compression molds is to start with a "plug" of a polybutadiene (PBD) material or blends thereof, and compression mold the "plug" into a golf ball core. The "plugs", or preforms, are typically cylinders of polybutadiene (PBD) or PBD blends which are supplied with much larger volume than required by the core geometry. This assures sufficient material to mold the core and also formulate adequate matrix in which to hold the cores together for easy de-molding at the end of the cycle. Techniques, such as "bumping", which open up the mold shortly after it is first closed for the low pressure step are well known for the purpose of releasing air pockets that are trapped in the cavity and are detrimental to the molding of good golf ball cores. The next step is to surround the core with of a golf ball cover, or for a three piece ball, an inner cover is placed over the core prior to the cover being formed.

Prior to the present invention, molding processes consisted of low pressure cures wherein inner cores were loaded into multi-cavity mold frames and after a set pre-heating process, they were held under low pressure (with a partially open press) to melt and displace significant amounts of material. Once the low pressure cure step was complete, the press closed at full hydraulic pressure to displace the remaining excess material and form the cover over the core while still continuing to maintain a high temperature set point. The temperature set point was set high enough to melt excess material out and maintain the sizes especially at the poles. While melt flow varied due to climate changes and material specification changes, it was necessary to periodically adjust the temperature set points to maintain correct pole sizes.

The present invention provides for a new method to control the process steps which involves instrumentation that monitors and controls the movement of the mold halves, in response to each other, rather than having their movement predetermined by set timers. It is now possible to precisely monitor material movement out of the cavities by monitoring mold closing movement. If the change over from the Low Pressure molding phase to the High Pressure close is performed without the proper displacement of a specific amount of prep material, this may "deform" cores and "trap" more material than desired. Also, the change over from Low Pressure molding to High Pressure molding should be implemented with a variety of possible pressure and temperature values to adapt to the variations in the process conditions. This often happens in process steps that are controlled by timers without any closed loop control. But, by allowing position control of the mold halves to dictate the process procedure, many variations of the process are thereby removed and the movement and loss of material is controlled. This improves molding stress and dramatically reduces voids and early durability failures, as well as geometry variations and distortions.

Figure 2:
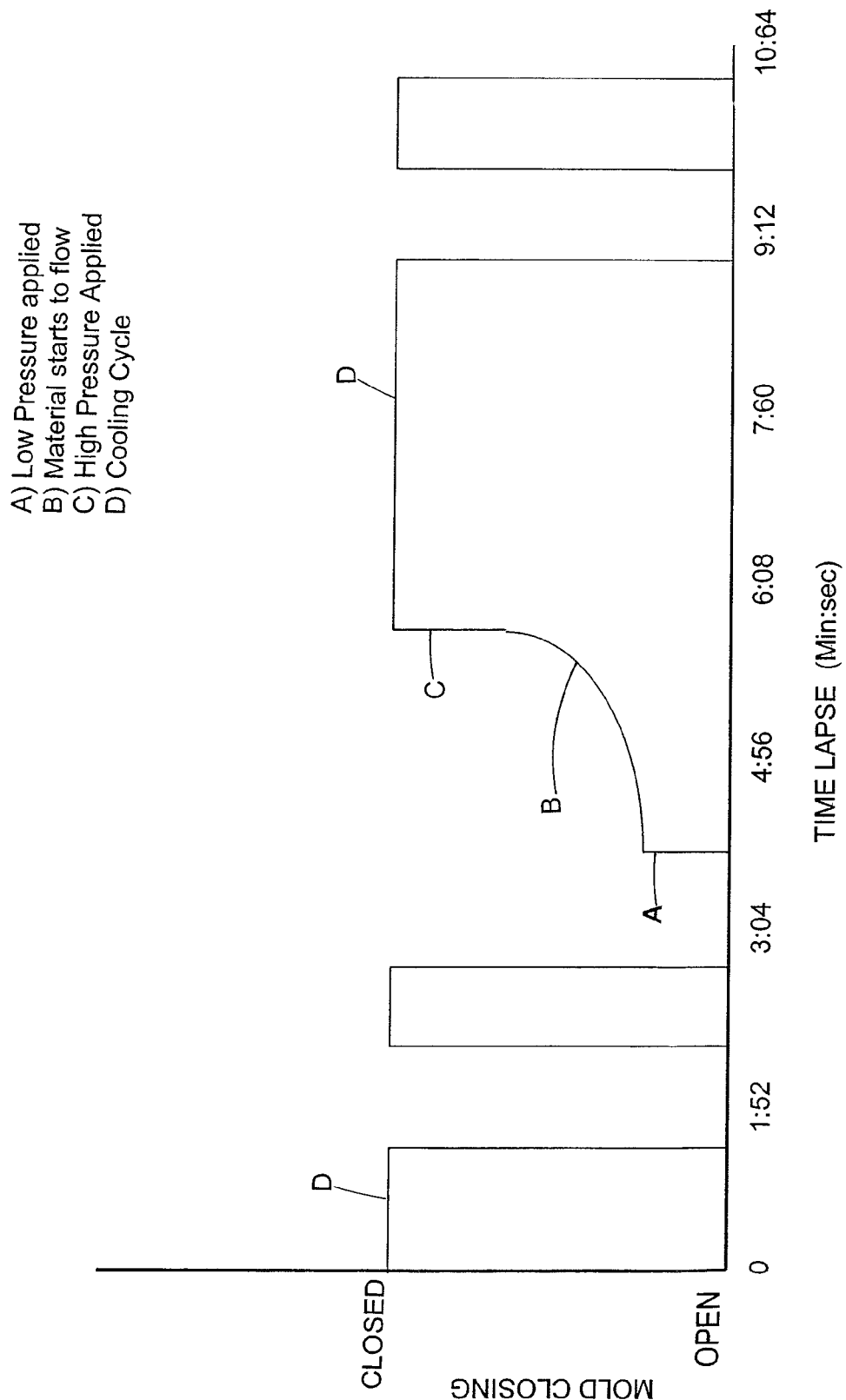
FIG. 2 is a typical graph showing the compression cycle as it pertains to time versus the amount of opening in the molds.
Figure 3:
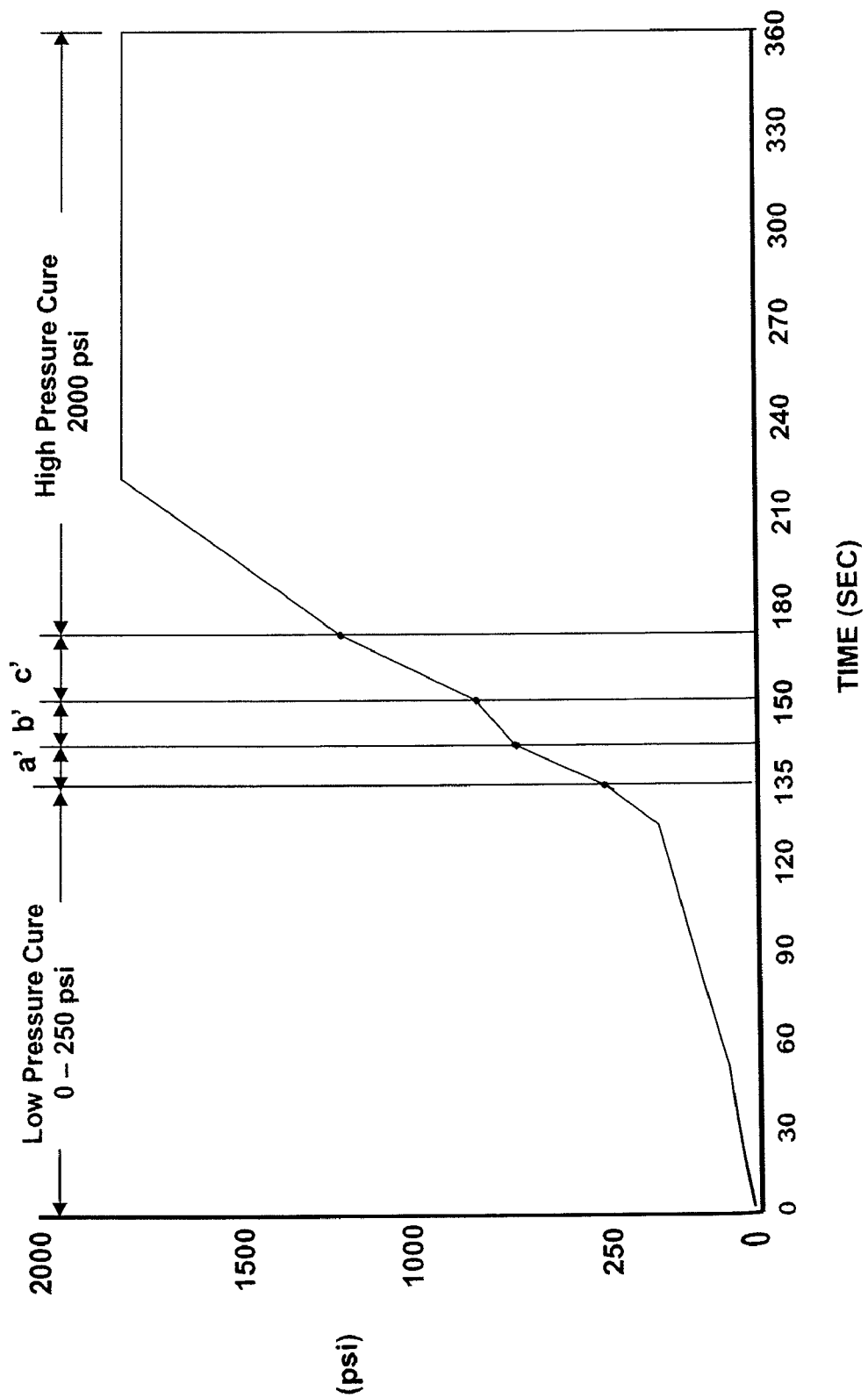
FIG. 3 is a typical graph showing the compression cycle as it relates to time versus mold pressure.

The present invention provides for a process to improve the compression molding of a cover layer over a golf ball core. It provides for an accurate compression molding wherein melt flow of the cover material is optimized, the cavity pressure, close position, temperature, and hydraulic pressure are closely controlled by instrumentation to automatically govern the movement and conditions in which the Ram press operates to optimize the compression molding process. The instrumentation monitors the compression molding press, its molds and tooling, along with its facilities, to gather and use feedback from the process to actively dictate press movement and to time and develop a well defined and controlled process to produce improved and consistent product characteristics such as compression, size, roundness, and improvement As seen in FIG. 1, the mold 10 consists of a frame 12, which holds two compression molds 14 which are double stacked. Each compression mold 14 is comprised of multi-cavity plates, an upper 16 and a lower 18, which have defined therein multiple hemispherical cavities 20. Feedback devices, such as linear transducers, precisely measure and coordinate the mold close with ram position over time. One pressure transducer 24 precisely measures and monitors cavity pressure while another transducer 26 measures and monitors the hydraulic pressure of the supply line to the press over time. Temperature feedback devices such as thermocouples precisely measure and monitor mold and prep component temperatures over time. A controller (not shown) captures all of the Ram press data to provide very detailed real time process characteristics, and automatically controls the process variables to generate process conditions favorable to minimize the stress on the core. Also, this enables the press to actively determine when the material is ready to flow rather than being solely based on a set time from the beginning of the cycle. The linear transducer 22 depicts the movement of the ram during the molding process, and also the slope changes due to melt flow of the layer material as it reacts to pressure. The slope change when the material starts to flow is best seen in FIG. 3. The motion of the Ram press can be further controlled by a servo controller to make certain that the Ram moves at the desired specific speed once the layer material begins to flow. Graphs of this movement are shown on FIGS. 2 and 3. Depending upon product need, any number of pressure/velocity profiles can be employed between low pressure and high pressure ranges to control mold movement, core deflection and material movement. Three profiles 1', 2', and 3' are seen in FIG. 3, wherein movement of the mold is performed at one speed between about 250 psi to about 400 psi during profile 1', about 400 psi to about 650 psi during profile 2' and about 600 psi to about 1200 psi during profile 3'. The actual ranges can vary depending upon the variables that may effect the molding process. This provides better control than simply applying a particular pressure for a set period of time, which according to varied conditions can be either too short a period of time or too long.

The invention improves on the molding of a golf ball by providing a detailed view into what happens as the molding process unfolds. As seen in FIG. 2, very repeatable cycles happen as the low pressure close cycle starts movement of material from within the mold cavities. It is of the utmost importance that the molds remain apart during the Low Pressure Close and material begins to flow, however it is most critical in avoiding voids and "blow outs" that the High Pressure Close Phase begins at the most opportune moment, because too soon will result in product defects and too late will yield cover material that is not uniform. Up to now the decision for when the High Pressure Close cycle begins has been a set time at specific pressure and temperature based on experience. The time period, temperature, and pressure of the Ram press has been constantly monitored and corrected for changing variables. The present invention takes away all the guesswork. It is now known that the movement of the mold halves as they go into the close cycle can dictate when the low and high pressure cycles are to begin and when the cooling starts. A linear transducer 22, such as a linear potentiometer, produces readings in milli-volts which can be extrapolated into functions of distance. For instance, 0 milli-volts may indicate when the mold is completely open and 10 milli-volts when it is totally closed. Thus, movement of the mold during the critical last 0.4 inches of mold closing is precisely and efficiently controlled. The potentiometer indicates movement of the mold, and when this movement is coordinated in conjunction with temperature and pressure readings of the mold, this data is fed to the computer that subsequently controls the function of the Ram press. The press therein reacts to the movement of the mold opening, thus high pressure close cycle starts at exactly the optimum time which is when the cover layer material starts to melt and therein flow. Graphs, such as that of FIGS. 2 and 3, can be provided to indicate position, pressure, and temperature over time providing a unique signature of the process. It must be appreciated that the graphic information shown in FIGS. 2 and 3 are typical and provided for illustrative purposes. Depending upon the various molding conditions, the point that the High Pressure cure starts may be at a different time period or at a lesser or greater mold opening than shown in FIGS. 2 and 3. The important issue is that each set of varying parameters will have its own unique point. Furthermore, subsequent cycles can be controlled to duplicate this output and more importantly control some of the variables that are very difficult to control, such as core compression, melt flow of the cover material, room temperature and humidity. The movement of the press automatically compensates for the changes to produce the desired golf ball, such as temperature which is often a variable during the final closing of the mold. As the material starts to flow it is possible to have a higher temperature to promote rapid flow until the mold closes and then reduce temperature thereafter, thus temperature changes would follow ram position. Set cycle times are completely eliminated along with the human error element.

Golf balls made in accordance with the present invention can contain either a single-layer or multiple layers about the core, and the inner core may be extremely large (1.300"-1.950") and/or very soft (20-50 PGA) while the outer layers are extremely thin. One embodiment may produce a urethane or urea cover over a large and/or soft polybutadiene core, and also a core encased with a thin ionomer layer. Final ball compressions can be in the range of 30-60 PGA, while inner component (core) compression is in the range of 20-50 PGA. The resulting product has a high spin and very soft feel.

One method the present invention employs to precisely control most critical compression molding process parameters is a servo controlled ram that programs the pressure steps by controlling cavity pressure, core deflection and material displacement at any point of the mold closing process right from the beginning of the molding and especially during the last 0.4" of mold closing.

The position of the mold indicates resultant material displacement (rheology) due to heat, pressure and time in the cavity. These hydraulic/electric servo controlled pressure profiles can be fine-tuned to obtain a final outcome such as a thin ionomer cover molded over a very soft core without deforming and shifting of PBD core while maintaining good roundness.

One method enables the chart/mapping of the entire compression cover molding process with online data collected from various feedback devices such as thermocouples, pressure transducer (for hydraulic psi), linear potentiometer (to indicate mold position) to develop and produce high quality golf balls or inner casings especially "very hard to mold" thin ionomer covers over ultra soft and large cores.

Figure 4:
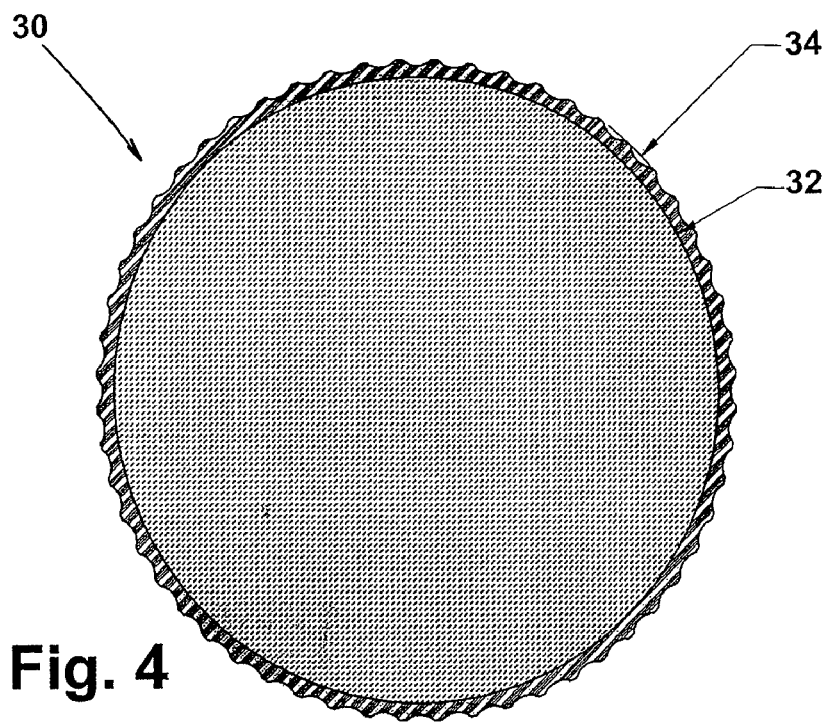
FIG. 4 is a cross-section view of a two-piece ball made in accordance with the present invention.

One embodiment of the invention is depicted by FIG. 4, wherein a golf ball 30 comprises a two-piece construction: a core 32 which is encased and surrounded by a cover 34. The core 32 can have a diameter between about 1.55 inches and about 1.62 inches. Although the core 32 can be a wound inner core with a solid or fluid-filled center, preferably, it is solid. Suitable materials for the core include base rubber materials including resilient polymers such as polybutadiene, natural rubber, polyisoprene, styrene-butadiene, ethylene-propylene-diene rubber, highly neutralized polymers, and combinations thereof. Examples of suitable rubber compounds include polybutadienes made and sold by the Bayer Corporation of Akron, Ohio under the tradenames CB23, CB22, and BR60 and made and sold by the Goodyear Tire and Rubber Company of Akron, Ohio under the tradename 1207G.

In one embodiment, the core is made from a polybutadiene rubber (PBD) that has a mid Mooney viscosity range greater than about 40, more preferably in the range from about 40 to about 80 and more preferably in the range from about 40 to about 60 Mooney. Polybutadiene rubber with higher Mooney viscosity may also be used, so long as the viscosity of the PBD does not reach a level where the high viscosity PBD clogs or otherwise adversely interferes with the manufacturing machinery. It is contemplated that PBD with viscosity less than 65 Mooney can be used with the present invention. A "Mooney" unit is a unit used to measure the plasticity of raw or unvulcanized rubber. The plasticity in a "Mooney" unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Golf ball cores made with mid to high Mooney viscosity PBD material exhibit increased resiliency, hence distance, without increasing the hardness of the ball. Such cores are soft, i.e., compression less than about 60 PGA and more specifically in the range of about 15-55 PGA, and when these soft cores are incorporated into golf balls such cores generate very low spin and long distance when struck by a driver.

CB 23, which has a Mooney viscosity of about 51 and is a highly linear polybutadiene, is a preferred PBD. If desired, the polybutadiene can also be mixed with other elastomers known in the art, such as natural rubber, various copolymers comprising styrene and butadiene, and/or polymers comprising isoprene, such as trans-isoprene, in order to further modify the properties of the inner core. When a mixture of elastomers is used, the amounts of other constituents in the inner core composition are typically based on 100 parts by weight of the total elastomer mixture.

Other suitable core materials including thermosetting polymers, such as natural rubber, other grades of polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E.I. Du Pont de Nemours and Company, various manufacturers, and Shell Chemical Company, respectively. The inner core materials can also be formed from a partially or fully neutralized ionomer, a metallocene or other single-site catalyzed polymer or a castable thermosetting or thermoplastic material. Suitable castable materials include those comprising a polyurethane, polyurea, epoxy, silicone, IPN's, etc. Golf ball inner cores made with these inner core materials have a PGA compression of preferably less than 90, more preferably less than 80 and most preferably less than 70.

Additionally, other suitable core materials are disclosed in U.S. Pat. No. 5,919,100 and international publications WO 00/23519 and WO 01/29129. These disclosures are incorporated by reference herein in their entireties. One particularly suitable material disclosed in WO/29129 is a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized.

The core may also include a cross-linking agent, a cross-linking aid or activator, a weight or density adjusting additive and a free radical initiator. The use of cross-linking agents in golf ball cores is known in the art. Suitable cross-linking agents include the reaction product of an unsaturated carboxylic acid or acids and an oxide or carbonate of a metal such as zinc, magnesium, barium, calcium, lithium, sodium, potassium, cadmium, lead, tin and the like. For example, the unsaturated carboxylic acids include α- or β-ethylenic unsaturated acids such as acrylic acid, methacrylic acid, itaconic acid, crotonic acid, sorbic acid and mixtures thereof. The unsaturated carboxylic acids and metal salts thereof are generally soluble in the elastomeric base, or are readily dispersible. For example, metal salt diacrylates, dimethacrylates, or mono(meth)acrylates are preferred for use in the golf ball cores of the present invention, and zinc diacrylate is a particularly preferred cross-linking agent. Other metal salt di- or mono-(meth)acrylates suitable for use in the present invention include those in which the metal is calcium or magnesium.

The core can also include a cross-linking activator to promote sufficient cross-linking of the base rubber material. A suitable cross-linking activator is zinc oxide. Zinc oxide can also be used as a weight adjusting filler and to achieve a higher coefficient of restitution. Additional processing aids such as dispersants and activators may optionally be included. In particular, zinc stearate may be added as a processing aid (e.g. as an activator). Any of a number of specific gravity adjusting fillers may be included to obtain a preferred total weight of the core. Examples of such fillers include tungsten and barium sulfate. Preferably, the specific gravity adjusting filler is tungsten.

A free radical initiator is included in the core to promote cross-linking of the base rubber material and the cross-linking agent. The free radical initiator promotes cross-linking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Preferably, the peroxide is an organic peroxide. Suitable peroxides include dicumyl peroxide, n-butyl 4,4'-bis(butylperoxy)valerate, 1,1-bis(t-butylperoxy)-3,3,5-trimethyl cyclohexane, di-t-butyl peroxide and 2,5-di-(t-butylperoxy)-2,5 dimethyl hexane and the like and mixtures thereof. In one embodiment, the free radical initiator is Trigonox®, which is commercially available from Akzo Nobel Chemicals B.V. of Amersfoort, The Netherlands. The total amount of initiators used will vary depending on the specific end product desired and the particular initiators employed.

Other useful initiators would be readily apparent to one of ordinary skill in the art without any need for undue experimentation. The initiator(s) at about 40% to about 100% activity are preferably added in an amount ranging between about 0.05 pph and about 5 pph based upon 100 parts of polybutadiene, or polybutadiene mixed with one or more other elastomers. More preferably, the amount of initiator added ranges between about 0.15 pph to about 2 pph and most preferably between about 0.25 pph to about 1.5 pph. Suitable commercially available dicumyl peroxides include Perkadox BC, which is a 90% active dicumyl peroxide, and DCP 70, which is a 70% active dicumyl peroxide.

Golf balls constructed in accordance with the present invention are substantially free of halogenated organo-sulfur compounds, including organic compounds wherein at least one sulfur compound is added to the material, that are typically added to golf ball inner cores to increase the resiliency and the coefficient of restitution of the ball. Examples of these halogenated organo-sulfur compounds include, but are not limited to, pentachlorothiophenol (PCTP) and salts of PCTP such as ZnPCTP.

Figure 5:
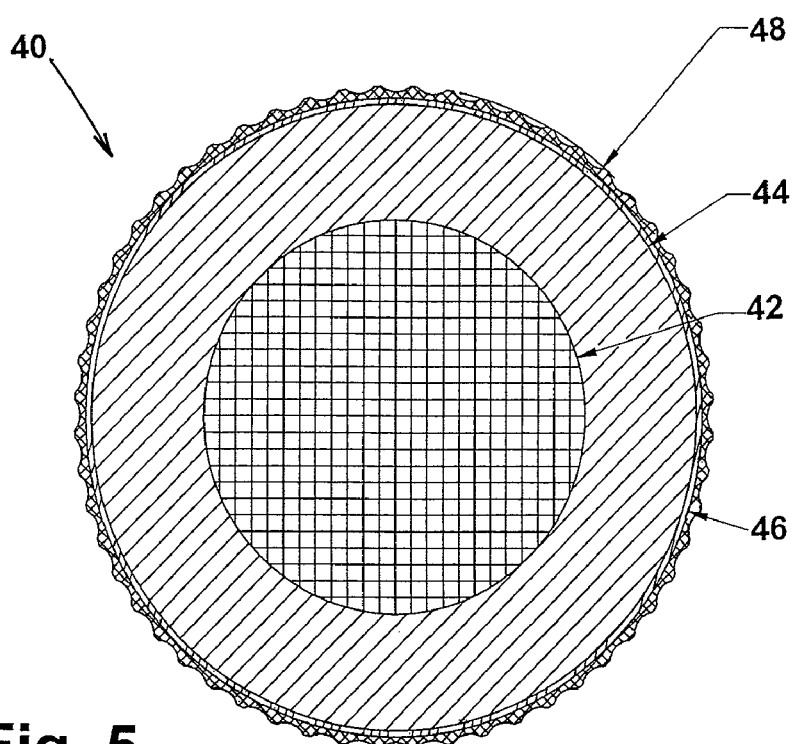
FIG. 5 is a cross-section view of a four-piece ball made in accordance with the present invention.

An embodiment comprising a four piece ball 40 is displayed on FIG. 5, wherein the ball 40 comprises a center core 42 which is encased by an outer core layer 44 that is in contact therewith. Encasing the outer core layer 44 is a very thin mantle layer 46 and the ball is completed with a cover layer 48. The thickness of the center core is about 1.00 inch and the outer core thickness is about 0.295 inch therein bringing the core diameter to about 1.590 inches. The thickness of the mantle layer 46 is extremely thin and can in this embodiment is only about 0.015 inch. With a thinner outer core layer 44 the thickness of the mantle layer may be about 0.055 inch, and preferably from about 0.020 inch to about 0.040 inch. The mantle layer 46 is constructed of materials that provide for a Shore D hardness of from about 60 or higher, and preferably about 65 or higher. The mantle layer 46 is preferably made from thermoplastic materials. More preferably, the material is a non-ionomeric polymer. Suitable thermoplastic materials for the mantle layer include polyethylene, polystyrene, polypropylene, thermoplastic polyesters, acetal, polyamides including semicrystalline polyamide, polycarbonate (PC), shape memory polymers, polyvinyl chloride (PVC), trans-polybutadiene, liquid crystalline polymers, polyether ketone (PEEK), bio(maleimide), and polysulfone resins. In one embodiment, the mantle layer includes an ethylene/methacrylic acid copolymer, an ethylene/acrylic acid copolymer or blends thereof. Suitable ethylene/methacrylic acid copolymers include Surlyn®8527, which is commercially available from E.I. du Pont de Nemours and Company of Wilmington, Del. Other preferred thermoplastics for forming inner cover include single-site catalyzed polymers including non-metallocene and metallocene, polyurethane, polyurea and combinations thereof. Suitable polymeric materials also include those listed in U.S. Pat. Nos. 6,187,864, 6,232,400, 6,245,862, 6,290,611 and 6,142,887 and in PCT publication No. WO 01/29129, which are all incorporated herein by reference in their entirety. Suitable materials are also disclosed in an U.S. patent application entitled "Golf Ball with Vapor Barrier Layer," bearing application Ser. No. 10/077,081, filed on Feb. 15, 2002. The entire disclosure of this application is incorporated herein by reference.

The cover layer 48 surrounds the inner cover and is in contact therewith. The thickness of the cover layer 48 is less than about 0.045 inches and preferably less than about 0.035 inches. The cover layer 48 is constructed of materials that provide for a shore D hardness of from about 62 or less and preferably about 55 or less. These materials include materials commonly known to those of skill in the art. Preferably, the material includes polyurethane, polyurea, or a combination thereof. While the outer cover is preferably formed with a plurality of dimples or surface protrusions defined on the outer surface thereof, the polymer forming the outer cover may include fillers embedded in a polymeric matrix or binder material.

Conventionally, thermoset polyurethanes are prepared using a diisocyanate, such as 2,4-toluene diisocyanate (TDI) or methylenebis-(4-cyclohexyl isocyanate) (HMDI) and a polyol which is cured with a polyamine, such as methylene-dianiline (MDA), or a trifunctional glycol, such as trimethylol propane, or tetrafunctional glycol, such as N,N,N',N'-tetrakis (2-hydroxypropyl)ethylenediamine. However, the present invention is not limited to just these specific types of thermoset polyurethanes. Quite to the contrary, any suitable thermoset polyurethane may be employed to form the outer cover layer of the present invention. In one embodiment, the outer cover includes castable polyurethanes and castable polyureas.

Overall, the golf ball, whether it be the two-piece ball 30 or the four-piece ball 40, is formulated and constructed to have a compression from about 80 up to about 90 and coefficient of restitution of greater than about 0.805. As used herein, compression is measured by applying a spring-loaded force to the golf ball center, golf ball inner core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as: (Atti or PGA compression)=(160-Riehle Compression).

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A method of compression molding a thin cover layer over a soft, large golf ball core, the method comprising:
   providing a Ram press having a pair of molds, each mold having upper and lower mold frames, each frame containing multiple hemispherical cavities;
   placing a pair of hemispherical cover layer shells around a golf ball core in each lower cavity;
   moving the Ram press such that the molds are placed in a low pressure closing direction in respect to each other, the Ram press responding to data provided by a lineal potentiometer;
   monitoring the cavity pressure with a pressure transducer and measuring the temperature of the cover layer to determine flow point;
   controlling the amount of core deflection and cover material displacement during the mold closing, employing a servo controller to control movement of the Ram press during the last 0.4 inch of mold closing;
   applying high pressure to the molds after the cover material starts to flow;
   cooling the mold; and
   opening mold and releasing cured golf ball.

2. The method of claim 1, wherein the golf ball core has a diameter of about 1.55 inches to 1.62 inches.

3. The method of claim 1, wherein the golf ball core comprises a polybutadiene rubber having a Mooney viscosity from about 40 to 60.

4. The method of claim 1, wherein the core comprises a soft compression range between about 15 to about 55 PGA.

5. The method of claim 1, wherein the core comprises a cross-linking agent.

6. The method of claim 5, wherein the core further includes a cross-linking activator.

7. The method of claim 1, wherein the cover layer is 0.045 inch thick or less and has a Shore D hardness less than 62.

8. The method of claim 7, wherein the cover layer is 0.035 inch thick or less.

9. The method of claim 1, wherein the cover layer has a Shore D hardness of at least 60.

10. The method of claim 1, wherein the golf ball comprises a core of at least 1.62 inches in diameter and a maximum hardness of about 25 PGA, and a cover surrounding the core having a maximum thickness of 0.030 inch and a Shore D hardness of at least 65.

11. A method of compression molding a thin ionomer layer over a soft, large golf ball core, the method comprising:
    providing a Ram press having a pair of molds, each mold having upper and lower mold frames, each frame containing multiple hemispherical cavities;
    placing a pair of hemispherical ionomer shells around a golf ball core in each lower cavity;
    moving the Ram press such that the molds are placed in a low pressure closing direction in respect to each other, the Ram press responding to data provided by a lineal potentiometer;
    monitoring the cavity pressure with a pressure transducer and measuring the temperature of the ionomer layer to determine flow point;
    controlling the amount of core deflection and ionomer layer material displacement during the mold closing, employing a servo controller to control movement of the Ram press during the last 0.4 inch of mold closing;
    applying high pressure to the molds after the ionomer material starts to flow;
    cooling the mold; and
    opening mold and forwarding the encased core to the next processing step.

12. The method of claim 11, wherein the golf ball core has a diameter of about 1.55 inches to 1.62 inches.

13. The method of claim 11, wherein the golf ball core comprises a polybutadiene rubber having a Mooney viscosity from about 40 to 60.

14. The method of claim 11, wherein the core comprises a soft compression range between about 15 to about 55 PGA.

15. The method of claim 11, wherein the core comprises a cross-linking agent.

16. The method of claim 15, wherein the core further includes a cross-linking activator.

17. The method of claim 11, wherein the ionomer layer is 0.030 inch thick or less and has a Shore D hardness of at least 60.

18. The method of claim 11, wherein the golf ball comprises a core of at least 1.62 inches in diameter and a maximum hardness of about 25 PGA, and an ionomer layer surrounding the core having a maximum thickness of 0.030 inch and a Shore D hardness of at least 65.

* * * * *